Oct. 15, 1946.                H. E. CARNAGUA                2,409,541
                      VARIABLE SPEED TRANSMISSION CONTROL
                              Filed July 1, 1944                2 Sheets-Sheet 1
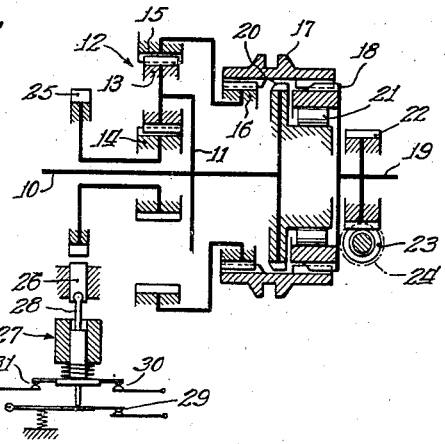
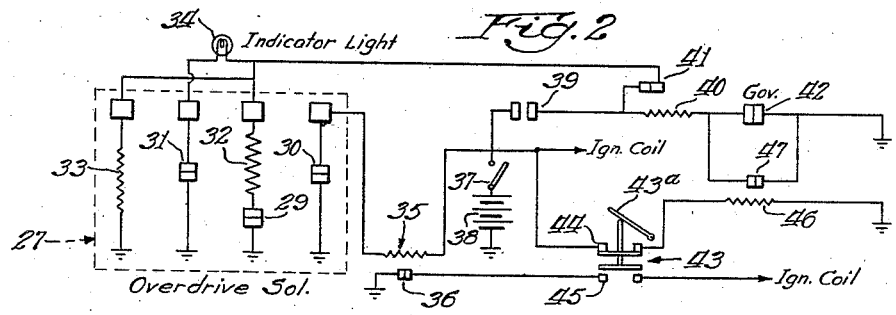
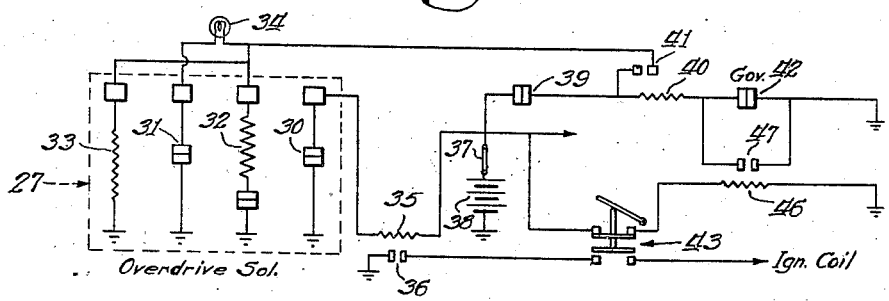
Inventor:
Harold E. Carnagua

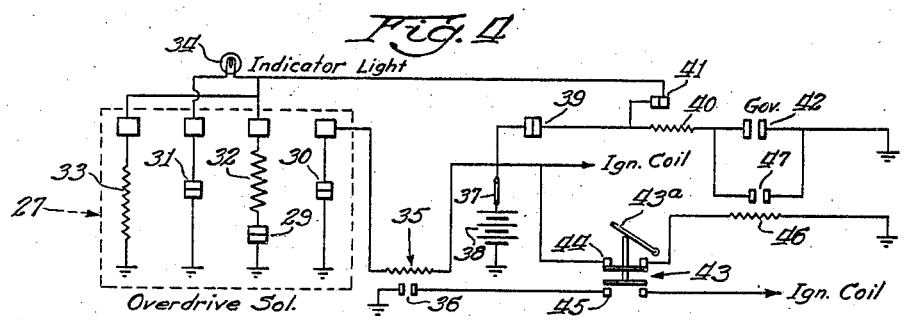
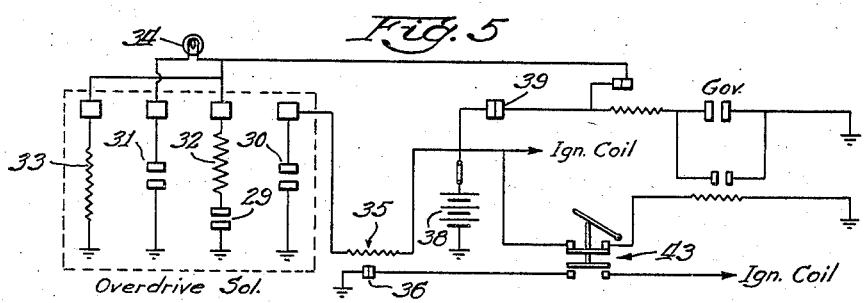
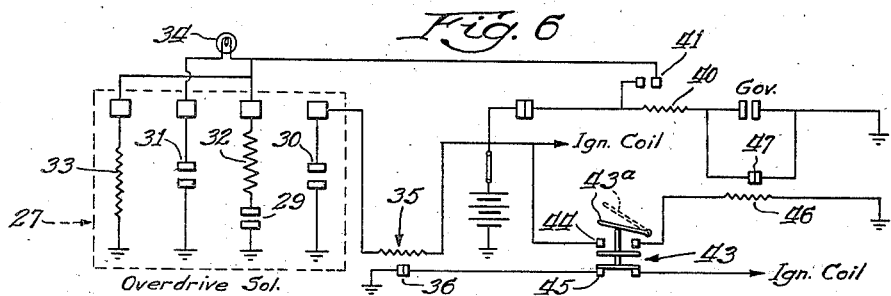
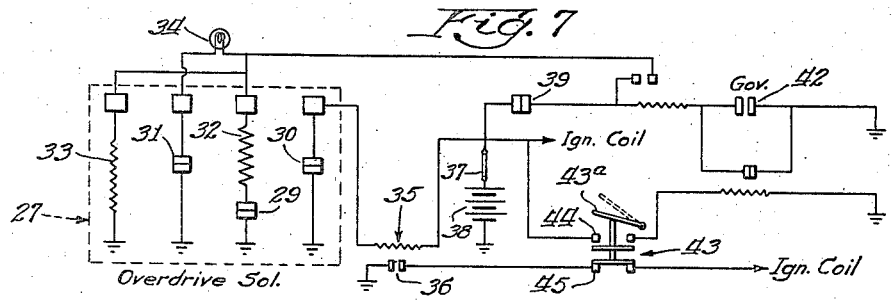

Patented Oct. 15, 1946

2,409,541

UNITED STATES PATENT OFFICE 2,409,541

VARIABLE-SPEED TRANSMISSION CONTROL

Harold E. Carnagua, Muncie, Ind., assignor to Borg-Warner Corporation, Chicago 4, Ill., a corporation of Illinois Application July 1, 1944, Serial No. 543,165

5 Claims. (Cl. 192—3)

This invention relates to a control device for a variable speed power transmission. For purposes of illustration it will be described with reference to a two-speed planetary transmission, but it is to be understood that the invention may be applied with equal facility to a countershaft type transmission.

The present invention is a modification of a control for a two-speed planetary transmission which is disclosed in my co-pending application, Serial No. 309,718, filed December 18, 1939. In the said prior application there is described a two-speed planetary overdrive transmission having an automatically releasable control device for connecting the driving and driven structures together for direct drive, and an electrically controlled brake for the sun gear which when effective causes the driven shaft to rotate at a higher speed than the drive shaft, the direct drive control device releasing automatically to permit this higher speed drive. The brake mechanism is comprised of a radially slidable pawl which is adapted to engage a slotted disc fixed to the sun gear. The pawl is normally held in a released position by a spring and is caused to assume an engaged position by means of an electric solenoid, the armature of which is connected to the pawl through a spring so that the armature may be pulled up before the pawl is actually fully engaged. The solenoid in turn is controlled by an electric governor driven from the driven structure and also by a pair of manually operated switches, one of which is operated from the throttle pedal to effect a downshift after the pawl has once been engaged under governor control, and the other is operated by the shift rail of an associated reversing mechanism, so that a shift into overdrive is not possible when the reversing mechanism is operative.

The aforementioned application also discloses an ignition interrupting switch which is operated by a rod secured to the pawl and is closed when the pawl is in an engaged position, thereby to ground the ignition circuit and cause the engine to miss a few explosions to relieve the pawl of torque load, thus to enable the pawl to be withdrawn from the slotted disc without releasing the throttle pedal. It is one of the objects of this invention to provide a control circuit for a solenoid of the type described in which the switch for interrupting the ignition is normally in a closed position and is opened and maintained in an open position when the solenoid has caused the pawl to assume its engaged position.

It is another object of this invention to provide a control circuit for a solenoid in which the governor contacts are normally closed and are opened at or above the speed at which a shift to overdrive is to take place.

A more specific object of this invention is to provide a circuit including relays and switches which will cause the solenoid to operate despite the fact that the governor switch is open at the time the solenoid is to operate.

These and other objects and features of this invention will become apparent from the following description when taken together with the accompanying drawings in which:

Fig. 1 is a schematic diagram of a two-speed planetary transmission of the overdrive type to which this invention may be applied;

Fig. 2 is a wiring diagram for the control mechanism of Fig. 1, the diagram showing the condition the mechanism would assume when the vehicle in which the transmission is mounted is stationary and the reversing mechanism is either operated or is in neutral position; and Figs. 3 to 7 inclusive show the condition of the various components of the circuit of Fig. 2 under different operating conditions of the vehicle.

Referring now specifically to Fig. 1 for a brief description of the transmission to which this invention may be applied, the driving shaft 10 is shown at the left of Fig. 1 which may be the output shaft of an ordinary standard three-speed transmission in which a reverse drive is incorporated, or it may be any other form of speed reducing, torque multiplying and reversing mechanism of an automatic or manual variety. Said driving shaft 10 is connected to drive a carrier 11 of a planetary gear set 12, said gear set comprising a plurality of planetary pinion gears 13 rotatably mounted on carrier 11 and meshing with a sun gear 14 and a ring gear 15. Said ring gear 15 is connected to a set of clutch teeth 16 which mesh with a slidable clutch sleeve 17 and through said sleeve 17 drive a second set of clutch teeth 18 which may be formed on an enlarged portion of a driven structure or shaft 19.

Drive shaft 10 is also provided with a set of clutch teeth 20 which may be engaged by sleeve 17 to provide a positive two-way drive between drive shaft 10 and driven shaft 19. A roller-and-cam type automatically releasable clutch 21 also connects drive shaft 10 with driven shaft 19, clutch 21 being so constructed that driven shaft 19 may rotate faster than drive shaft 10, but is driven by said drive shaft 10 when its speed tends to become less than the speed of drive shaft 10.

A gear 22 is mounted on driven shaft 19 and is rotatable therewith, said gear meshing with a pinion 23 which in turn drives a governor 24 and if desired a speedometer or other auxiliary mechanism.

Sun gear 14 is rigidly connected to a slotted disc 25 with which is aligned a radially slidable pawl 26. When said pawl engages slotted disc 25, sun gear 14 is held against rotation in either direction. The position of pawl 26 is controlled by a solenoid 27, the circuit to which will be described hereinafter. A pawl rod 28 is secured to pawl 26 and movable therewith, said pawl rod being adapted to operate three switches 29, 30 and 31. Said switches are normally in a closed position when pawl 26 is in a released position, and are in an open position only when pawl 26 is in engagement with slotted disc 25 in a manner to hold sun gear 14 from rotating in either direction.

The constructional details of the solenoid, pawl, planetary gear set, slotted disc 25 and clutches are disclosed in the aforementioned prior application, Serial No. 309,718, and hence will not be repeated here.

Referring now to Fig. 2 for a description of the control circuit for the solenoid 27, the circuit is there shown in the positions the elements thereof will assume when the vehicle is stationary, the ignition is turned off and the associated transmission is set for neutral. The elements of the circuit comprise an operating coil 32 in solenoid 27 and a holding coil 33 in parallel with the operating coil 32. One of the switches, for example 29, is in series with operating coil 32 and it will be observed that all three switches 29, 30 and 31 are connected to ground on one side. Switch 31 is in series with an indicator light 34 the function of which is to apprise the operator of the fact that solenoid 27 has operated. As described in the aforementioned application, the pawl 26 is so designed that it will not engage a slot in disc 25 until there is a relative reversal of direction of rotation. This reversal may be brought about by releasing the throttle of the engine so as to cause the speed of drive shaft 10 to decrease relative to the driven shaft, whereupon at some suitable speed ratio between the drive and driven shafts, sun gear 14 will cease rotating and then will begin to rotate in the opposite direction.

Switch 30 is in series with an ignition control relay 35 which operates contacts 36. Said contacts are so arranged that when relay 35 is energized the contacts are open and when relay 35 is deenergized the contacts will close. Said relay 35 is also in series with an ignition switch 37 and a battery or other source of electromotive force 38 which in turn is grounded at one side.

Ignition switch 37 is also connected to a gear switch 39 which is operated by the control mechanism for the transmission from which the planetary transmission of Fig. 1 derives its power. It is so arranged that its contacts will be opened by the control mechanism when the transmission is in neutral or reverse drive. Switch 39 is in series with a solenoid relay 40 having a pair of contacts 41 and with a governor switch 42 which is grounded on one side. Contacts 41 of relay 40 are closed when the relay is de-energized and open when relay 40 is energized. Said contacts 41 serve to connect switch 39 (and hence battery 38) to operating coil 32 and holding coil 33 and also to indicator light 34.

Also connected to ignition switch 37 is a throttle-controlled switch 43 having two pairs of contacts 44 and 45. Contacts 44 control the operation of a kick-down relay 46 which is energized when ignition switch 37 is operative and the accelerator or throttle control switch 43 is in the position shown, that is, when the throttle 43a is in released position. The kick-down relay 46 is provided with a pair of contacts 47 which are open when the relay 46 is energized and closed when the relay is de-energized.

Thus it will be observed that when ignition switch 37 is off, the transmission ahead of planetary transmission on Fig. 1 is in neutral or reverse and the vehicle is stationary, the circuit to the solenoid 27 is broken and hence pawl 26 will be in its withdrawn position. Relays 35 and 46 will be de-energized and hence their contacts 36 and 47 respectively will be closed. Relay 40 will likewise be de-energized and its contacts 41 will be closed.

Referring now to Fig. 3, the circuit is shown in the condition wherein the ignition switch 37 is operated and the associated transmission has been shifted to forward speed. For simplicity it will be assumed that the forward speed is direct drive. Under these conditions relays 35 and 46 will be operated thereby opening the contacts controlled by these relays. Switch 39 having been closed by the shift into direct drive completes the circuit through relay 40 and governor contacts 42 thereby energizing relay 40 and preventing the completion of the circuit to the solenoid 27. Said solenoid 27 therefore will remain in the same condition (de-energized) it was in under the conditions shown in Fig. 2. It will be noted that under the conditions shown in Fig. 3, the operation of accelerator switch 43 has no effect upon either relay 40 or the ignition circuit. Thus the operation of the accelerator switch will not ground the ignition circuit and cause an interruption in the delivery of torque from the engine.

In Fig. 4 the circuit is shown with the governor switch operated. Governor switch 42 is controlled by the speed of driven shaft 19 and is set to open its contact at some predetermined speed which may be as low as 15 miles per hour. When the critical speed for the switch is reached, switch 42 will open thereby de-energizing relay 40 and causing contacts 41 thereof to close. Since switch 39 was previously closed by shifting the transmission ahead of the planetary gear set into direct drive, the circuit to solenoid 27 and indicator light 34 is complete, and hence operating coil 32 and holding coil 33 will be energized. This causes the solenoid to push pawl 26 toward slotted disc 25 and pawl rod 28 will be moved with pawl 26. Contacts 29, 30 and 31, however will remain closed until the operator releases the accelerator pedal to cause the engine to slow down relative to driven shaft 19. When slotted disc 25 stops in response to the slowing down of the engine and begins to rotate in the opposite direction, pawl 26 will move into engagement with a slot in disc 25, pulling pawl rod 28 with it and thus opening each of the contacts 29, 30 and 31. This latter condition is shown in Fig. 5. It will be observed in Fig. 5 that the opening of these switches causes indicator light 34 to go out, de-energizes operating coil 32 thereby decreasing the load on battery 38, and de-energizes relay 35 thereby causing contact 36 to close.

Assuming that the control mechanism is in the condition shown in Fig. 5 and the operator wishes to downshift to direct drive, he will depress the throttle to its wide-open position and, coincidentally, actuate throttle switch 43. The circuit will then assume the condition shown in Fig. 6. It will be observed that throttle switch contacts 44 are now open and throttle switch contacts 45 are closed. Opening contacts 44 causes kick-down relay 46 to become de-energized whereupon its contacts 47 will close. This in turn causes overdrive relay 40 to become operative and thus opens contacts 41 thereof. The opening of contact 41 in turn de-energizes holding coil 33 of overdrive solenoid 27 and pawl 26 will then be conditioned for retraction by the springs (not shown, see Carnagua Serial No. 309,718 filed December 18, 1939) which exert a pull upon pawl 26 to withdraw the pawl from slotted disc 25. However, the withdrawal of pawl 26 can not be effected as long as a torque load is impressed upon the pawl by slotted disc 25. The torque load is released by momentarily interrupting the ignition circuit; that is, by momentarily grounding the secondary coil of the ignition coil to cause the engine to miss several explosions. This momentary grounding of the ignition circuit is accomplished by the closing of contacts 45, and inasmuch as contacts 36 of ignition relay 35 are already closed the coil will be grounded and remain so as long as both switch 43 and relay 35 are in the conditions shown in Fig. 6.

Just as soon as the torque load is removed from pawl 26, the pawl and its rod 28 will be withdrawn, thereby closing contacts 29, 30 and 31. When switch 30 is closed, ignition relay 35 becomes energized and its contact 36 opens thereby restoring the ignition circuit despite the fact that accelerator switch 43 is still operated, and the engine will resume its operation. The closing of switch 29 conditions operating coil 32 of overdrive solenoid 27 for operation as soon as accelerator switch 43 is restored to the position shown in Fig. 5, namely, until the throttle is released and the need for increased acceleration has ceased. With the release of the accelerator pedal and its associated switch 43 the circuit will again assume the condition shown in Fig. 4 and upon the entry of the pawl 26 into a slot in slotted disc 25 will effect the condition shown in Fig. 5.

It is understood that although this invention has been described with respect to a solenoid which is adapted to operate a radially movable pawl to effect a change in ratio in a transmission, the circuit will be equally effective and adaptable to an axially movable pawl or in the case of a countershaft type transmission to an axially movable clutch member. It will also be understood that solenoid 27 may be used merely as a control mechanism for a fluid piston wherein the fluid pressure is the sole means for effecting a shift of the pawl 26 or its equivalent axially movable pawl or clutch as disclosed in my copending application Serial No. 403,197, filed July 19, 1941. The scope of the invention therefore, is not to be limited by the foregoing illustrative embodiment but is to be determined by the appended claims.

I claim:

1. A control mechanism for a vehicle change speed transmission to be used with a prime mover having an ignition circuit, said transmission including positively interengageable transmission control elements, one of which elements is movable toward and away from another element to establish and release a drive of a predetermined ratio through the transmission, means for moving said movable element into engagement with the said other element, electro-magnetic means for controlling the moving means, a plurality of switches which are closed in response to movement of the movable element to a released position and opened in response to movement of the movable element to engaged position, a relay, a switch operated by said relay and having contacts which are closed when the relay is de-energized, a source of electrical energy, a manually operated switch; said relay-operated switch, said manually operated switch, a portion of the electro-magnetic means and one of said plurality of switches being connected in series; a relay in series with another of said plurality of switches and with the source of electrical energy, a switch controlled by the second-mentioned relay and opened when the said second-mentioned relay is energized, vehicle speed controlled switch means controlling the energization of the first electro-magnetic means, and a manually controlled switch effective, when closed and when the positively interengageable elements are engaged and the prime mover is impressing a torque load on the elements, to ground the ignition circuit and thereby relieve the torque load on the elements.

2. A control mechanism for a vehicle change speed transmission to be used with a prime mover having an ignition circuit, said transmission including positively interengageable transmission control elements, one of which elements is movable toward and away from another element to establish and release a drive of a predetermined ratio through the transmission, means for moving said movable element into engagement with the said other element, electro-magnetic means for controlling the moving means, a plurality of switches which are closed in response to movement of the movable element to a released position and opened in response to movement of the movable element to engaged position, a relay, a switch operated by said relay and having contacts which are closed when the relay is de-energized, a source of electrical energy, a manually operated switch; said relay operated switch, said manually operated switch, a portion of said electro-magnetic means and one of said plurality of switches being connected in series; a relay in series with another of said plurality of switches and with the source of electrical energy, a switch controlled by the second mentioned relay and opened when the said second mentioned relay is energized, vehicle speed controlled switch means in series with the first-mentioned relay and adapted to energize the relay when the vehicle is moving below a predetermined speed thus to control the energization of the first electromagnetic means, and a manually controlled switch effective, when closed and when the positively interengageable elements are engaged and the prime mover is impressing a torque load on the elements, to ground the ignition circuit and thereby relieve the torque load on the elements.

3. A control mechanism for a vehicle change speed transmission as described in claim 1, a switch connected in shunt with said vehicle speed controlled switch means, relay means for operating said shunt connected switch such that said shunt switch is open when the relay means is energized, and additional manually operated switch means for controlling the energization of the shunt switch relay means.

4. A control mechanism for a vehicle change speed transmission as described in claim 1, a switch connected in shunt with said vehicle speed controlled switch means, a relay for operating said shunt connected switch and adapted to open the shunt switch when energized, a switch controlling the energization of said shunt switch relay and means for operating said last-mentioned switch simultaneously with the operation of the last-mentioned manually controlled switch whereby to de-energize the electro-magnetic means simultaneously with the relief of torque load on the transmission control element to permit the positively interengageable elements to move to a disengaged position.

5. A control mechanism for a vehicle speed change transmission to be used with a prime mover having an ignition circuit, said transmission including positively interengageable transmission control elements, one of which elements is movable toward and away from another element to establish and release a drive of a predetermined ratio through the transmission, an armature for moving said movable element into engagement with the said other element, a solenoid for controlling the armature, said solenoid having an operating coil and a holding coil, a pair of switches which are closed in response to movement of the movable element to a released position and opened in response to movement of the movable element to engaged position, a relay, a switch operated by said relay and having contacts which are closed when the relay is de-energized, a source of electrical energy, a manually operated switch; said relay operated switch, said manually operated switch, said operating coil and one of said pair of switches being connected in series; a relay in series with the other of said pair of switches and with the source of electrical energy, a switch controlled by the second-mentioned relay and opened when the said second-mentioned relay is energized, vehicle speed controlled switch means controlling the energization of the solenoid, and a manually controlled switch effective, when closed and when the positively interengageable elements are engaged and the prime mover is impressing a torque load on the elements, to ground the ignition circuit and thereby relieve the torque load on the elements.

HAROLD E. CARNAGUA.